United States Patent
Tsirkin et al.

(10) Patent No.: US 9,043,789 B2
(45) Date of Patent: May 26, 2015

(54) MANAGING SAFE REMOVAL OF A PASSTHROUGH DEVICE IN A VIRTUALIZATION SYSTEM

(75) Inventors: Michael Tsirkin, Raanana (IL); Alex Lee Williamson, Fort Collins, CO (US)

(73) Assignee: Red Hat Israel, Ltd., Raanana (IL)

( * ) Notice: Subject to any disclaimer, the term of this patent is extended or adjusted under 35 U.S.C. 154(b) by 238 days.

(21) Appl. No.: 13/603,849

(22) Filed: Sep. 5, 2012

(65) Prior Publication Data

US 2014/0068607 A1   Mar. 6, 2014

(51) Int. Cl.
*G06F 9/455* (2006.01)
(52) U.S. Cl.
CPC .. *G06F 9/45558* (2013.01); *G06F 2009/45579* (2013.01)
(58) Field of Classification Search
CPC ............................ G06F 9/45533; G06F 9/5077
USPC ............................................................ 718/1
See application file for complete search history.

(56) References Cited

U.S. PATENT DOCUMENTS

| 2007/0180493 A1* | 8/2007 | Croft et al. .................. 726/2 |
| 2008/0294825 A1* | 11/2008 | Mahalingam et al. ......... 710/262 |
| 2010/0250824 A1* | 9/2010 | Belay ........................ 711/6 |

\* cited by examiner

*Primary Examiner* — Emerson Puente
*Assistant Examiner* — Steven Do
(74) *Attorney, Agent, or Firm* — Lowenstein Sandler LLP

(57) ABSTRACT

Methods and systems for managing a removal of a passthrough device from a guest managed by a hypervisor in virtualized computing environment. A hypervisor receives a request from the guest for access to a passthrough device. The hypervisor sets, in a memory, a last accessed state associated with a virtual machine executing the guest. The hypervisor forwards the request to the passthrough device and configures the host CPU to send a subsequent access request directly to the passthrough device. In response to a virtual machine reset, the hypervisor clears the last accessed state and instructs the host CPU to send a post-reset access request to the hypervisor.

19 Claims, 5 Drawing Sheets

FIGURE 3

| ACCESS MANAGEMENT TABLE | | | |
|---|---|---|---|
| VIRTUAL MACHINE ID | GUEST ID | DEVICE NAME/ID | Last Accessed State |
| VM 1 | Guest A | Printer 123 | Yes |
| VM 2 | Guest B | Display 456 | No |
| VM 3 | Guest C | PCI 12Z-789 | Yes |

MANAGING SAFE REMOVAL OF A PASSTHROUGH DEVICE IN A VIRTUALIZATION SYSTEM

TECHNICAL FIELD

Embodiments of the present invention relate to a computer system, and more specifically, to management of a passthrough computing device.

BACKGROUND

In a virtual computing environment, devices may be removed from a host computer via a hot unplug, wherein the device is removed while a virtual machine is running. The device, however, typically has software (e.g., a device driver) executing within a guest running on the virtual machine that enables communication with the device. It is difficult to write or code the device software (e.g., the device driver) in a way that would enable the guest to handle the sudden disappearance of the device resulting from a hot unplug. As such, to remove a device, the device software on the guest operating system is first notified of the removal, explicitly acknowledges the hot unplug request, and enters a state in which it is safe to remove the device (e.g., including removing power from the device). However, this removal process may be time consuming, particularly if the guest is slow, the guest is not operating properly or if the guest lacks the hot unplug processing functionality.

In cases where a hot unplug of a device is initiated via a management interface of the hypervisor (e.g., by an administrator of the hypervisor), the hypervisor notifies the guest of the hot unplug request. In response, the guest notifies the device software of the request which in turn performs any necessary clean-up (e.g., removal of power from the device) to enable the safe removal of the device. In addition, the guest may perform operating system clean up to prepare for the safe removal of the device. Finally, the guest then notifies the hypervisor that it is safe to remove the device. However, there are instances when the guest is in a state in which it is unable to receive the hot unplug request (e.g., in a boot sequence or the guest is down), and the guest is unable to prepare the device software (e.g. the driver) for the removal of the device. In addition, the guest may receive the hot unplug notification, but the guest may be reset and lose the notification event and fail to take the necessary steps to prepare for the safe removal of the device.

BRIEF DESCRIPTION OF THE DRAWINGS

FIG. 3 illustrates an example access management table for use in managing device removal in a virtual computing environment, according to one embodiment of the invention.

DETAILED DESCRIPTION

Figure 1:
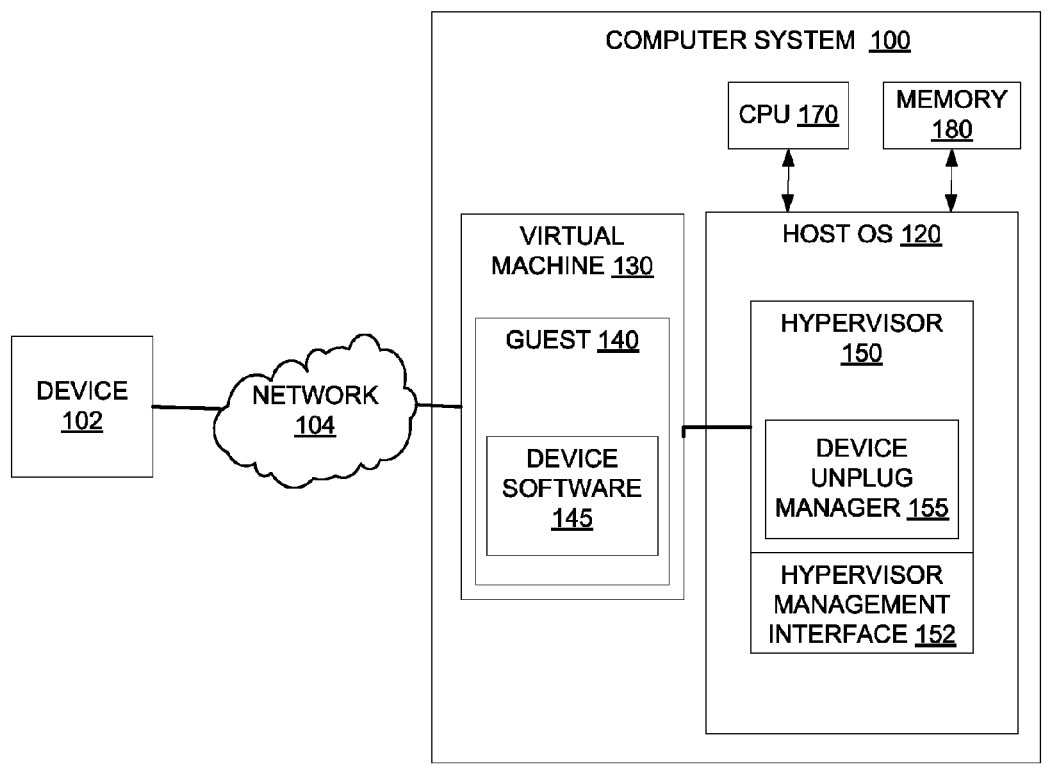
FIG. 1 is a block diagram of an example virtual machine system illustrating a device unplug management environment, according to one embodiment of the invention.

Methods and systems for managing a removal (e.g., a hot unplug) of a device from a guest managed by a hypervisor in a virtual computing environment. The hypervisor includes a device unplug manager configured to track access to the device by a guest and determine if a hot unplug of the device (e.g., removal of the device while the virtual machine (VM) is running) may be performed safely. In an embodiment, the device unplug manager maintains information relating to the activity of the guest and device which indicates whether the guest has accessed the device since a last reset or starting of the virtual machine resulting in a removal of state information from the guest. In an embodiment, the information (also referred to as the "accessed after last reset state" or "last accessed state") may be maintained as a binary flag or bit which is in a first state if the guest accessed the device after the last reset of the VM (e.g., a 'set', 'Yes', or '1' value) or a second state (e.g., a 'cleared', 'No', or '0' value) if the guest has not accessed the device since the last reset of the virtual machine.

At the time a virtual machine is started or reset, the last accessed state is cleared (e.g., assigned a 'No' or '0' value). The device unplug manager is configured to track access requests for the device, and when the guest accesses the device for the first time, the last accessed state is set (e.g., assigned a 'Yes' or '1' value indicating that the guest accessed the device after the last reset of the VM). Upon receipt of a request to hot unplug the device initiated via the hypervisor (e.g., by a hypervisor administrator via a management interface of the hypervisor), the device unplug manager checks the last accessed state associated with the virtual machine executing the guest. If the last accessed state is set (indicating that the guest has accessed the device since the last reset or starting), the device unplug manager notifies the guest of the removal request. If the last accessed state is clear (indicating that the device has not been accessed since the last reset or starting of the virtual machine), the device unplug manager determines that it is safe to remove the device immediately (i.e., without waiting for an acknowledgment from the guest) and, optionally, notify the guest of the hot unplug request and/or the device removal.

In an embodiment, the device unplug manager is configured to track only access requests that return a state to the guest (e.g., a read access) when maintaining the last accessed state. In this embodiment, the device unplug manager sets the last accessed state when a read access request is identified, but keeps the last accessed state clear if an access request which does not affect state is identified (e.g., a write access request).

In another embodiment, the device unplug manager is configured to track only configuration access type requests for Peripheral Component Interconnect (PCI) devices (e.g., a network interface card, a sound card, etc.) since configuration access requests for PCI devices return a state to the guest. In this embodiment, the device unplug manager sets the last accessed state when a configuration access request for a PCI device is identified, but keeps the last accessed state clear if another access request which does not return state is identified (e.g., a memory write request). In another embodiment, the device unplug manager is configured to track only configuration read access type requests for PCI devices. In an embodiment, the device unplug manager is configured to ignore certain fields within a PCI configuration space for reads because those fields do not provide sufficient information to configure and make use of the PCI device. For example, reading vendor registers and device registers indicates that the guest knows the PCI device is there, but cannot make use of it without further probes and configuration. In an embodiment, the device unplug manager is configured to consider the PCI device unused unless the PCI device is configured to claim transactions on the PCI interface (e.g., I/O or memory enabled).

Throughout the following description, the term "guest" refers to the software that runs or can run on the hypervisor that is installed on a disk, loaded into memory, or is currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual central processing unit (CPU), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that allows for the safe hot unplugging of a device in a virtual machine computing system. The safe hot unplugging may be facilitated by checking a last accessed state in a reference table indicating whether a guest has accessed a device since a last reset of the virtual machine upon receipt of a request to hot unplug the device from the hypervisor management interface.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 in which embodiments of the present invention may operate. Although, the computer system 100 may host multiple virtual machines (VM), a single virtual machine 130 is shown in FIG. 1 for purposes of illustration. The virtual machine 130 runs a guest (e.g., guest 140) that uses a guest operating system to manage its resources. The guest 140 may access a device 102 (e.g., a printer, a display, a PCI device, a network device) via a network 104. Alternatively, the device 102 is part of the computer system 100 and is accessed by the guest 140 directly. In one embodiment, the computer system 100 is accessible by multiple remote systems via an interconnect (e.g., a virtual bus) and/or the network 104, which may be a private network (e.g., a local area network (LAN), a wide area network (WAN), intranet, etc.) or a public network (e.g., the Internet). The virtual machine 130 may run the same or different guest operating system, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc. In an embodiment, the guest 140 is configured to include software 145 associated with the device 102 (e.g., a device driver).

In one embodiment, the computer system 100 runs a hypervisor 150 to virtualize access to the devices 102 managed by the computer system 100, making the use of the virtual machine 130 transparent to the guest 140 and the users of the computer system 100. Although a single device 102 is illustrated in FIG. 1, it is noted that the computer system 100 may be configured to manage multiple devices 102. As shown in FIG. 1, access by the virtual machine 130 running the guest 140 to the device 102 is managed by the hypervisor 150. It should be noted that the devices 102 may be any physical or virtual device, such as, for example, a video display (e.g., a video graphics array (VGA)), a keyboard, a printer, a network component, and a peripheral component interconnect (PCI) device.

According to embodiments of the present invention, the computer system 100 may also include hardware components such as one or more physical central processing units (CPUs) 170, memory 180, and other hardware components. In one embodiment, the hypervisor 150 includes a device unplug manager 155. The device unplug manager 155 is a component (e.g., a set of instructions executable by a processing device of the computer system 100, such as CPU 170) configured to perform the actions described in detail below in connection with FIGS. 2 and 3. Although shown as a discrete component of the hypervisor 150, it is noted that the device unplug manager 155 may be a separate component externally coupled to the hypervisor 150.

In an embodiment, the hypervisor 150 may be managed via a hypervisor management interface 152 configured to receive a request (e.g., from a hypervisor administrator) for a hot unplug of the device 102 (e.g., removal of the device 102 from the guest 140). In an embodiment, the device unplug manager 155 is configured to track access to the device 102 by the guest 140 and determine if a hot unplug of the device 102 (e.g., removal of the device 102 while the virtual machine 130 is running) may be performed safely. In an embodiment, the device unplug manager 155 maintains a last accessed state indicating whether the guest 140 has accessed the device 102 since a last reset of the virtual machine 130. In an embodiment, the device unplug manager 155 maintains a reference table (e.g., the example access management table shown in FIG. 3) including the last accessed state information for multiple guests and devices. In an embodiment, the last accessed state information may be stored in any data store accessible by the device unplug manager 155, such as, for example, memory 180.

Figure 2:
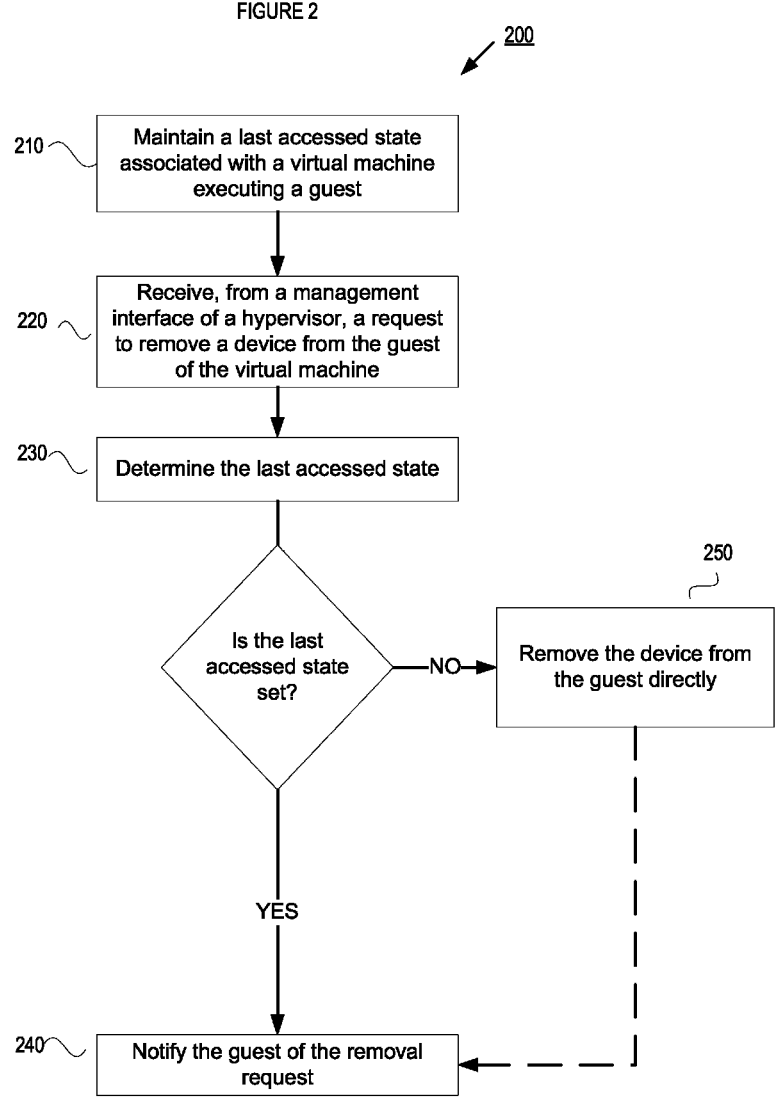
FIG. 2 is a flow diagram of a method for managing device removal in a virtual computing environment, according to one embodiment of the invention.

FIG. 2 is a flow diagram illustrating one embodiment of a method 200 for managing the unplugging or removal of a device (e.g., device 102 in FIG. 1) from a guest on a virtual machine (e.g., guest 140 on virtual machine 130 in FIG. 1). The method 200 may be performed by a computer system (e.g., computer system 100 of FIG. 1 or computer system 500 of FIG. 5) comprising hardware (e.g., circuitry, dedicated logic, programmable logic, microcode, etc.), software (e.g., instructions run on a processing device), or a combination thereof. In one embodiment, the method 200 is performed by the device unplug manager 155 of the hypervisor 150 of FIG. 1.

Referring to FIG. 2, in one embodiment, access to a device by a guest is tracked by the hypervisor and a last accessed state associated with a virtual machine executing a guest is maintained, in block 210. In an embodiment, the last accessed state indicates whether the guest has accessed a device since a last reset of the virtual machine. The term "reset" is used herein to refer to the starting of a virtual machine, an initial revocation of a virtual machine, a restart of the virtual machine, or any similar event resulting in a removal of the state information from the virtual machine. In an embodiment, the last accessed state may be maintained as a binary flag or bit which is in a first state if the guest accessed the device after the last reset of the VM (e.g., a 'set', 'Yes', or '1' value) or a second state (e.g., a 'cleared', 'No', or '0' value) if the guest has not accessed the device since the last reset of the virtual machine.

FIG. 3 illustrates an example access management table including last accessed state information maintained by the device unplug manager. As shown in FIG. 3, the access management table may include information identifying a virtual machine (e.g., a virtual machine ID such as "VM1", "VM2", "VM3"), an associated guest (e.g., a guest ID such as "Guest A", "Guest B", "Guest C"), an associated device (e.g., a device name or ID such as "Printer 123", "Display 456", "PCI 12Z-789"), and an associated last accessed state (e.g., 'Yes' or 'No'). In an embodiment, the access management table in FIG. 3 may be maintained in a data store (e.g., a database) stored in a memory accessible by the hypervisor, such as, for example, memory 180 shown in FIG. 1. The hypervisor may track and record entries in the access management table in any suitable format (e.g., tabular form) and may include entries having any suitable information to enable look-up of the last accessed state associated with a virtual machine, guest and/or device.

Referring to FIG. 2, in block 210, at the time of a reset of the virtual machine, the last accessed state is cleared (e.g., assigned a 'No' or '0' value). The device unplug manager is configured to track access requests for the device, and when the guest accesses the device for the first time, the last accessed state is set (e.g., assigned a 'Yes' or '1' value indicating that the guest accessed the device after the last reset of the VM). For example, the hypervisor may detect that a guest (e.g., Guest A) running on VM1 sent a request to access Printer 123. In response, the hypervisor sets the last accessed state associated with Guest A/Printer 123 to 'Yes.' In this example, if VM1 is then reset and the state information of Guest A is cleared, the hypervisor clears the associated last accessed state (e.g., the last accessed state is changed to 'No') in the access management table.

Upon receipt of a request to hot unplug the device initiated via the hypervisor (e.g., by a hypervisor administrator via a management interface of the hypervisor) in block 220, the device unplug manager checks the last accessed state associated with the virtual machine executing the guest, in block 230. If the last accessed state is set (indicating that the guest has accessed the device since the last reset), the device unplug manager notifies the guest of the removal request, in block 240. If the last accessed state is not set or clear (indicating that the device has not been accessed since the last reset), the device unplug manager determines that it is safe to remove the device directly (e.g., initiate the removal immediately including the removal of the device software (e.g., a device driver) from the guest, without first notifying the guest of the removal request or awaiting an acknowledgment from the guest). Optionally (as denoted by the dashed line in FIG. 2), following the direct removal of the device, the device unplug manager may notify the guest of the hot unplug request and/or the device removal.

In an embodiment, if the device unplug manager determines that it is not safe to remove the device immediately, and if the guest has not acknowledged the removal request when the virtual machine is later reset, the last accessed state is cleared and the device unplug manager determines that it is safe to remove the device immediately (i.e., without further waiting for an acknowledgment from the guest).

It should be noted that the hypervisor may execute multiple virtual machines and, as such, the method 200 would be performed with respect to the multiple virtual machines. For purposes of illustration, method 200 is described with reference to the removal of a single device from a single guest.

In another embodiment, the device unplug manager is configured to track only read access requests (and/or other request types which return a state to the guest) associated with a device. In this embodiment, the device unplug manager of the hypervisor traps and/or tracks a request from a guest and determines the type of access request. If a read access request is detected, the device unplug manager sets the last accessed state. If a write access request (or other request which does not affect state) is detected, the device unplug manager does not set the last accessed state (e.g., the last accessed state remains clear).

In another embodiment, for a device for which the guest does not maintain state information (e.g., PCI devices), the device unplug manager is configured to track only configuration access type requests. In this embodiment, in block 210, the device unplug manager sets the last accessed state when a configuration access request for a PCI device is identified, but keeps the last accessed state clear if another access request type which does not affect state is identified. In another embodiment, the device unplug manager is configured to trap only configuration read access type requests for PCI devices and modify the last accessed state in response to configuration read access type requests.

Figure 4:
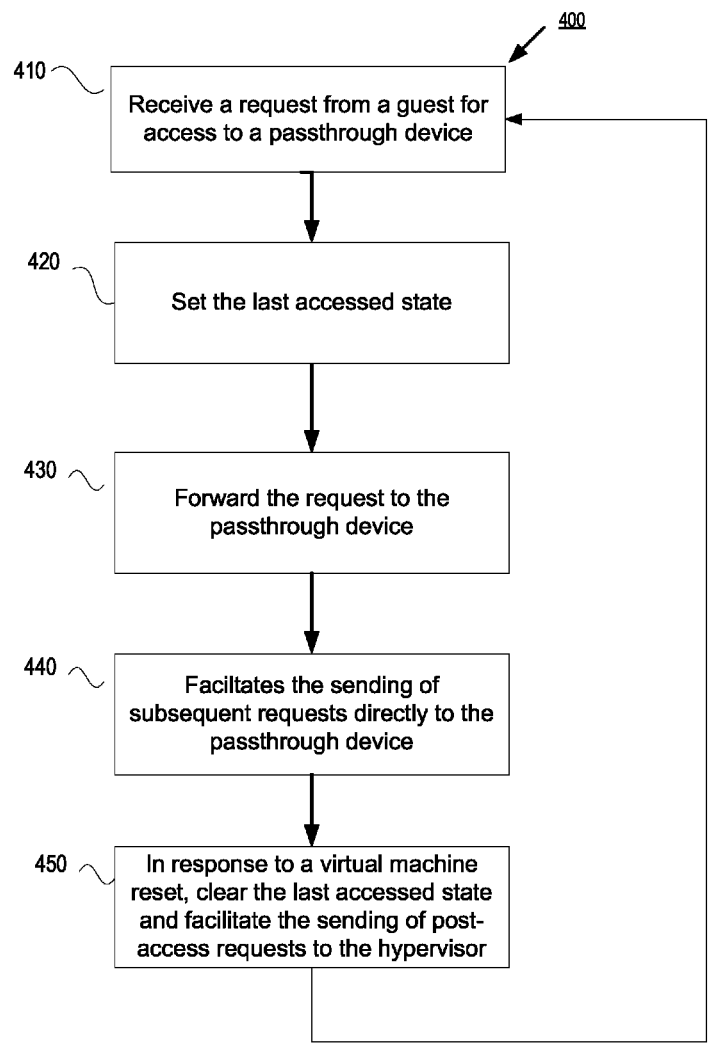
FIG. 4 illustrates a flow diagram of a method for removing a passthrough device in a virtual computing environment, according to embodiments of the present invention.

FIG. 4 is a flow diagram illustrating one embodiment of a method 400 for managing access requests from a guest to a passthrough device (e.g., a device which provides direct control (e.g., either complete control or partial control) to a guest). For passthrough devices, access requests may be sent directly from the guest to the passthrough device (e.g., PCI devices, a network device, etc.) without the request being trapped by the hypervisor.

In block 410, the device unplug manager of the hypervisor receives a request from a guest for access to a passthrough device. In response to receipt of the request, the hypervisor sets the last accessed state in a memory, in block 420. In block 430, the hypervisor forwards the "first" access request (e.g., a request received prior to the last accessed state being set) received from the guest to the intended passthrough device. In block 440, having set the last accessed state, the hypervisor facilitates the sending of subsequent guest access requests directly to the passthrough device (e.g., the hypervisor instructs the VM to provide direct access to the passthrough device for subsequent requests, the hypervisor configures the host CPU to send subsequent guest requests directly to the passthrough device, and/or the hypervisor configures the VCPU so that subsequent access requests go directly to the passthrough device).

In block 450, in response to a reset of the virtual machine running the guest, the hypervisor clears the last accessed state and instructs the host CPU to send further access requests (also referred to as post-reset requests) to the hypervisor. Accordingly, for example, an access request received following block 450 is treated like a "first" access request and blocks 410-440 are repeated, until a next virtual machine reset. Accordingly, in an embodiment, the first access request is trapped by the hypervisor for device unplug tracking purposes so that the last accessed bit can be set. Any subsequent access requests (e.g., access requests following the first access request and before a virtual machine reset) are sent directly to the passthrough device. This process may continue until a next reset of the virtual machine, at which time the hypervisor clears the last accessed state, instructs the host CPU to send a next access request (e.g., a post-reset request) to the hypervisor, and traps this "first" access request (e.g., a first access request following the reset).

In an embodiment, a physical computing system may be configured to manage a hot unplug of a connected device. In an embodiment, hardware logic is implemented on a hardware bus which the device resides on (referred to as a "hardware device unplug logic"). The hardware device unplug logic of the hardware bus may be configured to track access requests made by the operating system of the computing system to the device and determine if it is safe to unplug the device.

In an embodiment, the physical computing system to which the device is connected includes a physical button which may be pressed by a user if he or she wishes to remove, eject or unplug a connected device. In an embodiment, the physical button may be coupled to a light emitting diode (LED) (or other suitable indicator) configured to shut off to indicate that power has been removed from the device and notify a user that it is safe to remove the device from the computing system.

In an embodiment, the hardware device unplug logic is configured to track requests (e.g., packets) from the operating system of the computing system to the connected device. The hardware device unplug logic maintains a bit in an associated memory which indicates a last accessed state of the device (e.g., whether the operating system accessed the device since the last reset of the computing system). In an embodiment, the bit maintained in memory is cleared (e.g., set to '0') when the computing system is reset. In an embodiment, the bit is set (e.g., set to '1') when an access request is detected from the operating system to the connected device.

In an embodiment, when the user pushes the unplug or eject button, the hardware device unplug logic looks up the bit in memory and, if the bit is set (indicating there has been an access request by the operating system to the device since the last reset of the computing system), the hardware device unplug logic sends a notification to the operating system. If the bit in memory is clear (indicating that there has not been an access request since the last reset of the computing system), the hardware device unplug logic of the hardware bus powers down the device and turns off the red light to notify the user that the power has been removed and it is safe to remove the device. Optionally, the hardware device unplug logic may send a notification to the firmware (and then on to the operating system) that it is safe to unplug the device.

Figure 5:
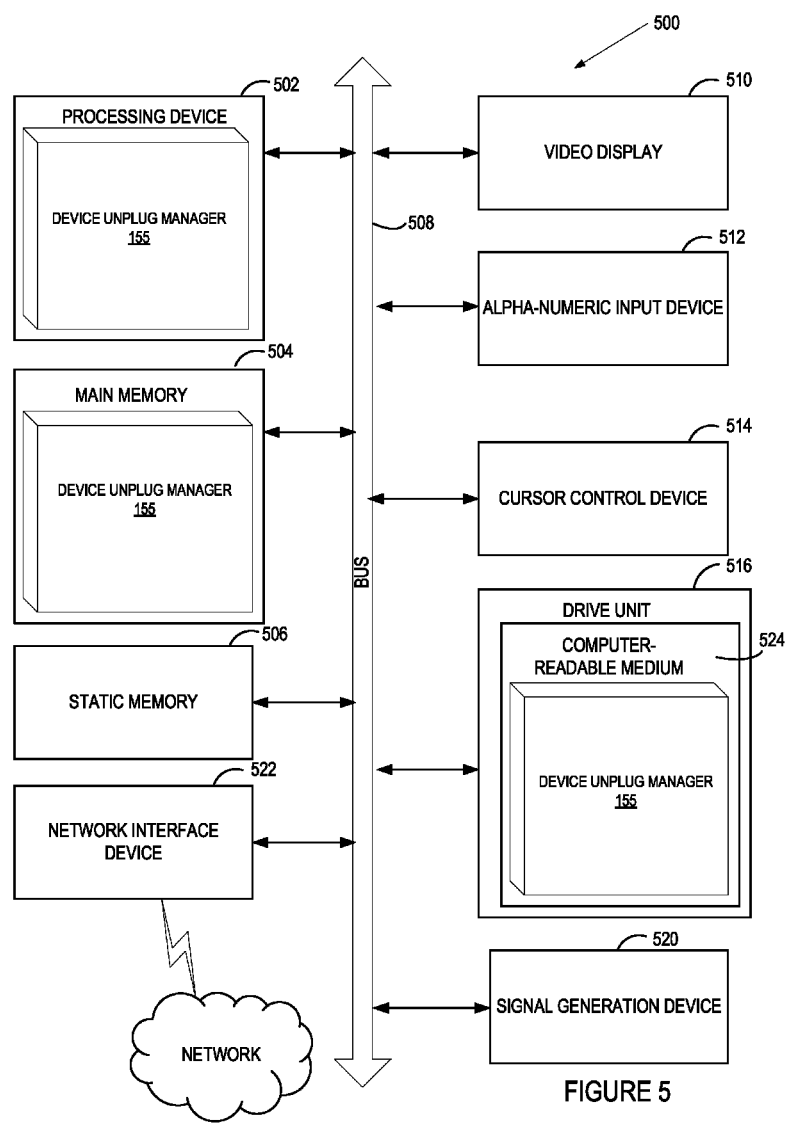
FIG. 5 illustrates a diagrammatic representation of an example device unplug management system.

FIG. 5 illustrates a diagrammatic representation of a machine in the example form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The device unplug manager 155 in FIG. 1 may comprise processing device 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the device unplug manager 155) embodying any one or more of the methodologies or functions described herein. The instructions of the device unplug manager 155 may also reside, completely or at least partially, within the main memory 504 and/or within the processing device 502 during execution thereof by the computer system 500, the main memory 504 and the processing device 502 also constituting computer-readable media. The instructions of the device unplug manager 155 may further be transmitted or received over a network via the network interface device 522.

While the computer-readable storage medium 524 is shown in an example embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "maintaining," "receiving", "removing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device executing a hypervisor, a request from a guest for access to a passthrough device;
   setting in a memory, by the hypervisor, a last accessed state associated with a virtual machine executing the guest, wherein the last accessed state indicates whether the guest accessed the passthrough device since a last reset of the virtual machine;
   forwarding, by the hypervisor, the request to the passthrough device;
   configuring, by the hypervisor, a host central processing unit (CPU) to send a subsequent access request directly to the passthrough device; and
   in response to a virtual machine reset, clearing the last accessed state and instructing the host CPU to send a post-reset access request to the hypervisor.

2. The method of claim 1, further comprising:
   receiving, by the hypervisor, a request to remove the passthrough device from the guest; and
   removing, by the hypervisor, the passthrough device associated with the guest without receiving an acknowledgment from the guest when the last accessed state is clear.

3. The method of claim 2, wherein the request to remove the passthrough device is received from a management interface of the hypervisor.

4. The method of claim 2, further comprising removing, by the hypervisor, the passthrough device associated with the guest without receiving an acknowledgement from the guest when the virtual machine is reset.

5. The method of claim 1, further comprising notifying the guest of the request to remove the passthrough device when the last accessed state is set.

6. The method of claim 1, further comprising:
   receiving, by the hypervisor, a first post-reset request from the guest for access to the passthrough device;
   setting in the memory, by the hypervisor, the last accessed state associated with the virtual machine executing the guest;
   forwarding, by the hypervisor, the first post-reset request to the passthrough device; and
   configuring, by the hypervisor, the host CPU to send a subsequent post-reset access request directly to the passthrough device.

7. The method of claim 1, wherein the request for access comprises a configuration access request and the passthrough device comprises a Peripheral Component Interconnect (PCI) device.

8. A non-transitory computer readable storage medium including instructions that, when executed by a processing device, cause the processing device to:
   receive, by the processing device executing a hypervisor, a request from a guest for access to a passthrough device;
   set in a memory, by the hypervisor, a last accessed state associated with a virtual machine executing the guest, wherein the last accessed state indicates whether the guest accessed the passthrough device since a last reset of the virtual machine;
   forward, by the hypervisor, the request to the passthrough device;
   configure, by the hypervisor, a host CPU to send a subsequent access request directly to the passthrough device; and
   in response to a virtual machine reset, clear the last accessed state and instructing the host CPU to send a post-reset access request to the hypervisor.

9. The non-transitory computer readable storage medium of claim 8, the processing device to:
   receive, by the hypervisor, a request to remove the passthrough device from the guest; and
   remove, by the hypervisor, the passthrough device associated with the guest without receiving an acknowledgment from the guest when the last accessed state is clear.

10. The non-transitory computer readable storage medium of claim 9, wherein the request to remove the passthrough device is received from a management interface of the hypervisor.

11. The non-transitory computer readable storage medium of claim 8, the processing device to notify the guest of the request to remove the passthrough device when the last accessed state is set.

12. The non-transitory computer readable storage medium of claim 8, the processing device to:
   receive, by the hypervisor, a first post-reset request from the guest for access to the passthrough device;
   set in the memory, by the hypervisor, the last accessed state associated with the virtual machine executing the guest, wherein the last accessed state indicates whether the guest accessed the passthrough device since a last reset of the virtual machine;
   forward, by the hypervisor, the first post-reset request to the passthrough device; and configure, by the hypervisor, the host CPU to send a subsequent post-reset access request directly to the passthrough device.

13. The non-transitory computer readable storage medium of claim 8, wherein the request for access comprises a configuration access request and the passthrough device comprises a Peripheral Component Interconnect (PCI) device.

14. A computer system comprising:
a memory;
a processing device, operatively coupled to the memory; and
a hypervisor executed by the processing device and having access to the memory, the hypervisor to:
receive a request from a guest for access to a passthrough device,
set in the memory a last accessed state associated with a virtual machine executing the guest, wherein the last accessed state indicates whether the guest accessed the passthrough device since a last reset of the virtual machine,
forward the request to the passthrough device,
configure a host central processing unit (CPU) to send a subsequent access request directly to the passthrough device, and
in response to a virtual machine reset, clear the last accessed state and instruct the host CPU to send a post-reset access request to the hypervisor.

15. The computer system of claim 14, the hypervisor to:
receive a request to remove the passthrough device from the guest, and
remove the passthrough device associated with the guest without receiving an acknowledgment from the guest when the last accessed state is clear.

16. The computer system of claim 15, wherein the request to remove the passthrough device is received from a management interface of the hypervisor.

17. The computer system of claim 14, the hypervisor to notify the guest of the request to remove the passthrough device when the last accessed state is set.

18. The computer system of claim 14, the hypervisor to:
receive a first post-reset request from the guest for access to the passthrough device,
set in the memory the last accessed state associated with the virtual machine executing the guest,
forward the first post-reset request to the passthrough device, and
configure the host CPU to send a subsequent post-reset access request directly to the passthrough device.

19. The computer system of claim 14, wherein the request for access comprises a configuration access request and the passthrough device comprises a Peripheral Component Interconnect (PCI) device.

* * * * *